United States Patent
Helbert

(10) Patent No.: US 12,411,346 B2
(45) Date of Patent: Sep. 9, 2025

(54) MODULAR STRAP FOR AN ELECTRONIC DEVICE

(71) Applicant: Apple Inc., Cupertino, CA (US)

(72) Inventor: Kendall L. Helbert, San Francisco, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 18/538,720

(22) Filed: Dec. 13, 2023

(65) Prior Publication Data

US 2024/0231112 A1    Jul. 11, 2024

Related U.S. Application Data

(60) Provisional application No. 63/479,145, filed on Jan. 9, 2023.

(51) Int. Cl.
| | | |
|---|---|---|
| *G06F 1/16* | (2006.01) | |
| *G02B 27/01* | (2006.01) | |
| *G06F 1/20* | (2006.01) | |

(52) U.S. Cl.
CPC ......... *G02B 27/0176* (2013.01); *G06F 1/163* (2013.01); *G06F 1/1632* (2013.01); *G06F 1/203* (2013.01); *G02B 2027/0156* (2013.01); *G02B 2027/0163* (2013.01)

(58) Field of Classification Search
CPC ........ G02B 27/0176; G02B 2027/0156; G02B 2027/0163; G02B 2027/0178; G02B 27/017; G06F 1/163; G06F 1/1632; G06F 1/203; G06F 1/206
See application file for complete search history.

(56) References Cited

U.S. PATENT DOCUMENTS

| | | |
|---|---|---|
| 10,168,555 B1 | 1/2019 | Cazalet et al. |
| 10,433,467 B2 | 10/2019 | Hurbi et al. |
| 2016/0212887 A1* | 7/2016 | Nikkhoo ............ H05K 7/20418 |
| 2017/0031395 A1 | 2/2017 | Osterhout et al. |
| 2018/0348812 A1* | 12/2018 | Miller .................. G06F 1/1686 |
| 2018/0376626 A1* | 12/2018 | Hurbi ...................... G02B 7/002 |
| 2019/0107870 A1* | 4/2019 | Ali ........................... G06F 1/203 |
| 2020/0041712 A1 | 2/2020 | Peroz et al. |
| 2020/0201042 A1 | 6/2020 | Wang et al. |
| 2021/0080732 A1 | 3/2021 | Hoover et al. |
| 2022/0346277 A1 | 10/2022 | Yoon et al. |
| 2023/0082748 A1* | 3/2023 | Lee ....................... G06F 1/1626 345/1.1 |

FOREIGN PATENT DOCUMENTS

| | | | | |
|---|---|---|---|---|
| WO | WO-9940643 A1 * | 8/1999 | .......... | H01M 8/1206 |
| WO | WO-2019135210 A1 * | 7/2019 | .......... | G02B 27/0176 |
| WO | WO-2020190288 A1 * | 9/2020 | .......... | G02B 27/0176 |
| WO | 2021011073 A1 | 1/2021 | | |

* cited by examiner

*Primary Examiner* — Towfiq Elahi
(74) *Attorney, Agent, or Firm* — Dorsey & Whitney LLP

(57) ABSTRACT

A head-mountable display (HMD) system includes a display portion, a modular securement assembly connectable to the display portion, and a dongle configured to connect the removable strap to at least one of a power supply, a computing device, or an external display. In some examples, the modular securement assembly includes: a removable strap with an electronics pod with a thermal shell and a thermal conduit; and a retention band connectable to the removable strap.

17 Claims, 8 Drawing Sheets

MODULAR STRAP FOR AN ELECTRONIC DEVICE

CROSS-REFERENCE TO RELATED APPLICATION(S)

This application claims priority to U.S. Provisional Patent Application No. 63/479,145, filed 9 Jan. 2023 and entitled "Modular Strap for an Electronic Device," the disclosure of which is hereby incorporated by reference in its entirety.

FIELD

The described embodiments relate generally to wearable electronic devices. More particularly, the present embodiments relate to modular wearable electronic devices and associated components.

BACKGROUND

Recent advances in portable computing have enabled head-mountable display (HMD) systems that provide augmented and virtual reality (AR/VR) experiences to users. These HMD systems have many components, such as a display, viewing frame, lens, batteries, and other components. Certain components of the HMD system can also help create a unique user experience. HMD display systems typically include a display, where a user can view and interact with visualizations presented on the display screen of the HMD.

In addition, conventional HMD systems can also be difficult to program, develop, and test new software. Indeed, conventional HMD systems suffer from a lack of efficient connectivity that can facilitate adequate testing parameters. Furthermore, thermal ergonomics are a challenge for HMD systems. In particular, thermal ergonomics are an increasing challenge as HMD system components are designed with reduced form factors that typically draw thermal elements closer to the user, which can add to user discomfort. Additionally, increases in thermal energy dissipation often result in component degradation. Therefore, there is a need for improvement to the connectivity to HMD systems while reducing an amount of heat transferred to users.

SUMMARY

An aspect of the present disclosure relates to a head-mountable display (HMD) system. The HMD system can include a display portion with a display, a modular securement assembly connectable to the display portion, and a dongle connectable to the removable strap and to at least one of a power supply, a computing device, or an external display. In some examples, the modular securement assembly includes: a removable strap comprising an electronics pod with a thermal shell and a thermal conduit; and a retention band connectable to the removable strap.

The HMD system can further include a processor that, in response to a threshold thermal output of the electronics pod, throttles a power bandwidth or a data bandwidth through the removable strap. In some examples, the dongle comprises a split dongle configured to connect the removable strap to the power supply and at least one of the computing device or the external display. In another example, the dongle comprises a split dongle configured to connect the removable strap to an additional removable strap.

In certain examples, the thermal shell comprises a clad with at least a copper layer, a first stainless steel layer, and a second stainless steel layer. In particular examples, the copper layer is positioned between the first stainless steel layer and the second stainless steel layer. The thermal conduit can comprise a first thermal connector configured to thermally couple one or more components of the electronics pod and the copper layer. In particular examples, the thermal conduit comprises a second thermal connector configured to thermally couple the copper layer and a thermal spreader positioned beyond the electronics pod.

Another aspect of the present disclosure relates to a removable strap for an HMD system. The removable strap can include a display connector, a dongle connector, an electronics pod, and a thermal spreader. In some examples, the electronics pod is positioned between the display connector and the dongle connector, the electronics pod comprising a heat source. In certain examples, the thermal spreader is positioned at least between the electronics pod and the dongle connector, the thermal spreader configured to dissipate thermal energy from the electronics pod.

In one or more examples, the electronics pod comprises a thermal shell comprising a thermal interface material. In particular examples, the thermal shell is overmolded with a fluorocarbon rubber. In certain examples, the electronics pod comprises an outer surface defining an etched portion exposing the thermal shell. In at least one example, the thermal spreader is in contact with the thermal shell through the etched portion. In one example, the thermal shell is at least partially exposed inside the electronics pod. In one example, the thermal interface material comprises at least one of a copper layer or a graphite layer. In one example, the heat source comprises at least one of a battery of a system-on-chip.

Yet another aspect of the present disclosure relates to an HMD system. The HMD system can include a display portion, a modular securement assembly connectable to the display portion, a first dongle, and a second dongle. In these or other examples, the modular securement assembly comprises: a first removable strap comprising a first thermal shell and a first thermal spreader, a second removable strap comprising a second thermal shell and a second thermal spreader, and a retention band. In one or more examples, the first dongle is configured to connect the first removable strap to a power supply, and the second dongle is configured to connect the second removable strap to at least one of a computing device or an external display.

In one example, the first dongle comprises a first bandwidth, and the second dongle comprises a second bandwidth greater than the first bandwidth. In one example, at least data is transmissive through the second dongle. In one example, at least one of the first dongle or the second dongle comprises a cable management mechanism.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
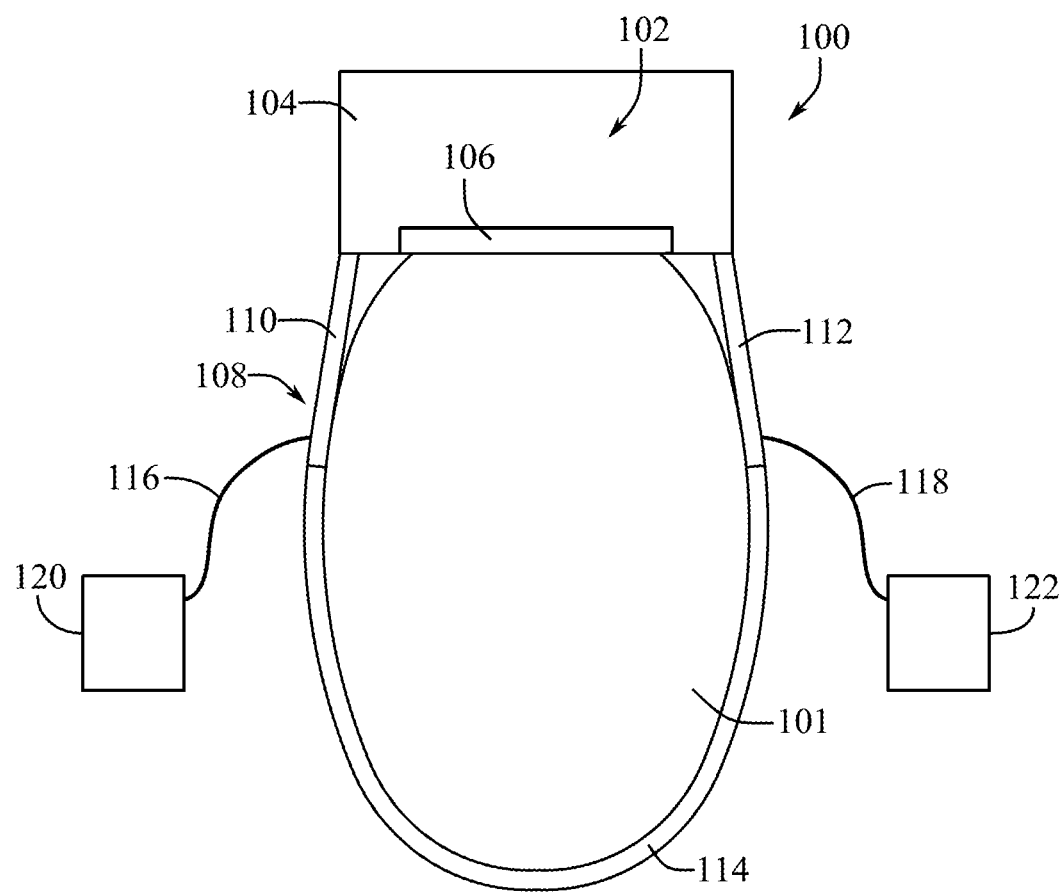
FIG. 1 shows a top view of an example of an electronic device donned by a user.

Detailed reference will now be made to representative embodiments illustrated in the accompanying drawings. The following descriptions are not intended to limit the embodiments to one preferred embodiment. Rather, it is intended to cover alternatives, modifications, and equivalents as can be included within the spirit and scope of the described embodiments as defined by the appended claims.

As virtual reality (VR) and mixed reality (MR) become more ubiquitous, the demand for user friendly head-mounted displays with quality components increases. Traditionally, these VR/MR systems have been devices that include a wearable display component, often referred to as a head-mounted display (HMD) and a supplemental unit. The supplemental unit can be part of the HMD, or can be a separate component that is permanently or removably connected to the HMD through a cable, wires, or other conductors. The supplemental unit can provide power and/or added processing functionality to the system.

Devices of the present disclosure include one or more additional dongles for improved connectivity to such supplemental components. For example, an HMD system of the present disclosure includes a first dongle for attaching a power supply to a first removable strap (e.g., a modular band of the HMD system). In addition, the HMD system includes a second dongle for attaching an external computing device or display to a second removable strap (e.g., another modular band of the HMD system). With separate, designated dongles (e.g., one for power and the other for data transmission), the HMD system of the present disclosure can significantly improve throughput. Advantageously, this can facilitate developers or programmers to rapidly upload and download data from the HMD system, while separately powering the device.

In addition, the present disclosure relates to various thermal ergonomic improvements for a removable strap. Removable straps can include a variety of electrical components, including a battery, integrated circuit, and a speaker (to name a few). Such electrical components can generate large amounts of thermal energy, particularly for longer use durations and heavy computing applications. Thus, given the location of a removable strap (and its associated electrical components) being next to a user's head, managing thermal output is important.

To reduce or mitigate hotspots along the removable straps, the present disclosure includes electrical pods positioned along the removable straps. These electrical pods can include a thermal shell and other thermal elements that provide a combination of heat shielding and heat dissipation. In so doing, the removable straps can provide increased comfort to a user. In addition, the removable straps can reduce (or more efficiently spread) a thermal load.

These and other embodiments are discussed below with reference to FIGS. 1-12. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a top view of a wearable electronic device 100 being worn on the head 101 of a user. The wearable electronic device 100, as well as other wearable electronic devices disclosed herein, can also be referred to as HMD systems, electronic devices, or simply as devices. The device 100 can include a number of modular components. For example, the device 100 can include a head-mounted display (HMD) 102 including a housing 104 and a display 106 attached to the housing 104 for displaying images to a user.

The HMD can also be referred to as a display portion or display module having the display 106. The display portion can include the housing 104 and display 106 that at least partially constitutes the HMD. In one or more examples, including the example shown in FIG. 1 and other examples shown in other figures, the HMD 102 can also be referred to as an output component, output module. Such output components, modules, or portions can include one or more outputs other than visual outputs from a display. For example, an output module similar to the HMD 102 can include a speaker that outputs sound instead of or in addition to the display 106 shown in FIG. 1.

In addition, one example of the device 100 can include a modular securement assembly 108 that secures the HMD 102 to the user's head 101. The modular securement assembly 108 includes removable straps 110, 112. The modular securement assembly 108 further includes a retention band 114. The modular securement assembly 108 is therefore configured to removably secure the wearable electronic device 100, including the HMD 102, to the head 101 of the user when the removable straps 110, 112 and retention band 114 are connected as shown in FIG. 1.

In particular examples, the removable straps 110, 112 removably (i.e., detachably) connect to both of the HMD 102 and the retention band 114. For example, each of the removable straps 110, 112 can be removably connected to the HMD 102 (or the housing or the display portion thereof) and the retention band 114 at opposing ends of each removable strap 110, 112 as shown in FIG. 1. In such an example, the modular securement assembly 108 is modular in that each of the removable straps 110, 112, and the retention band 114 can be connected and detached, as may be desired. For instance, each of the removable straps 110, 112 can be removed from the modular securement assembly 108 and swapped out for one or more other modules, straps, or electronic components.

One or more other examples of the device 100 can include alternative configurations of the removable straps 110, 112 shown in FIG. 1. For example, the device 100 can be positioned elsewhere along the modular securement assembly 108 (differently than what is shown in FIG. 1). In addition, one or more examples of wearable electronic devices described herein can include one or more intermediate members, flexible straps, or other optional supplemental components and electronic modules such as external power supplies, memory components, and/or processors.

In the example shown in FIG. 1, when the device 100 is worn on the head of the user, the removable strap 110 is positioned on the left side of the user's head and the removable strap 112 is positioned on the right side of the user's head. The retention band 114 can span between the removable straps 110, 112 to wrap around the back of the user's head 101, as shown.

In some examples, and as shown, the device 100 can be worn on the user's head 101 such that the HMD 102 is worn on the user's face and disposed over one or both of their eyes. The HMD 102 can be removably and/or releasably connected to one or more of the removable straps 110, 112 as mentioned above. In some examples, the removable straps 110, 112 can be positioned against the side of a user's head 101 and in contact therewith. In some examples, the removable straps 110, 112 can be positioned above the user's ear or ears. In some examples, the removable straps 110, 112 can be positioned adjacent to the user's ear or ears. The removable straps 110, 112 can be removably connected to the retention band 114, which can extend around the user's head 101 and removably connect to the other of the removable straps 110, 112. In this way, the HMD 102, removable straps 110, 112, and retention band 114 can form a loop that can retain the wearable electronic device 100 on the user's head 101.

As shown in FIG. 1, the removable straps 110, 112 can connect to the HMD 102, both mechanically and electrically. In particular examples, the removable straps 110, 112 can receive and/or relay at least one of data or power via such connections. In these or other examples, the removable straps 110, 112 can connect to the HMD 102 at an HMD connection location that can include an electrical input or electrical connector that is attached to the housing 104 and electrically connected to the display 106. This location can be identified as a temple area that can be defined as an area near a user's temple adjacent to the user's eye, and can span from in front of the user's eye to approximately 1-1.5 inches past the outer corner of a user's eye, along the side of the user's head 101.

Similarly, the removable straps 110, 112 can connect to the retention band 114 at a retention band connection location identified as an area that can span to include the area above the user's ear or within 0.5 inches of the outer edge of the ear on either side. In this manner, the removable straps 110, 112 are able to provide structural support between the HMD 102 and the user's ear, while securely connecting the retention band 114 and transferring the retention forces of the retention band 114 through the device 100. It should be understood, however, that this configuration is just one example of how the components of a modular wearable electronic device 100 can be arranged, and that in some, a different number of removable straps and/or retention bands can be included.

While a user wearing an HMD 102 on his or her head 101 is shown as one example of a wearable electronic device, the modular components, features, and advantages of various examples of electronic devices disclosed herein can also apply to other wearable electronic devices having securement mechanisms, including but not limited to wearable smart watches, fitness trackers, smart glasses, medical monitor devices, and so forth. For example, the housing 104 and display 106 of HMD 102 shown in FIG. 1 can also be configured as a housing and display for a smart watch module secured to the user's arm or wrist via a modular securement mechanism or assembly similar to the securement assembly 108 shown in FIG. 1. Although referred to as a wearable electronic device 100, it should be understood that the device 100 can include multiple modular components or devices and can be interchangeably referred to as a wearable electronic device, wearable electronic device system, and/or wearable electronic system. Additionally, although the particular component 102 can be referred to as an HMD, it should be understood that the terms HMD, HMD device, and/or HMD system can be used to refer to the wearable device 100 as a whole.

In particular examples, the device 100 (or HMD system) includes one or more dongles 116, 118 that are connectable to external components or devices, as will now be discussed. As used herein, the term "dongle" can refer to a piece of electrical hardware such as a connection, adapter, boot, or coupling between an external device/component and one or more components of the device 100 to provide additional functionality, or enable a pass-through to another device that adds functionality. A dongle can include electrical connections for data and/or power transmission through the dongle. In particular examples, a dongle can be uni-directional or bi-directional in terms of data and/or a power transmission.

As shown in FIG. 1, the dongle 116 connects the removable strap 110 to a power supply 120. As used herein, the term "power supply" refers to any power source that supplies power to one or more components of the device 100 (e.g., to charge a battery or power a processor such as a microcontroller within the removable strap 110). For example, a power supply can include fuel cells, battery cells, generators, alternators, solar power converters, motion-based converters (e.g., that convert vibrations or oscillations into power), etc. In particular implementations, a power supply can convert alternating current to direct current (or vice-versa) for charging or recharging components of the device 100. Some particular examples of a power supply can include a switched mode power supply, an uninterruptible power supply, an alternating current power supply, a direct current power supply, a regulated power supply, a programmable power supply, a computer power supply, and a linear power supply.

Additionally shown in FIG. 1, the dongle 118 connects the removable strap 112 to an external device or display (DoD) 122. An external device can include a smartphone, a tablet, a smart television, a desktop computer, a laptop computer, a server/network device, a virtual reality device, an augmented reality device, a smart watch, a sound/speaker device, a camera device, or other computing device. Further, an external display can include a monitor, device screen (e.g., a display screen for a laptop, television, phone, tablet, etc.), projector, or other suitable visual medium.

In at least some examples, the external DoD 122 includes a developer computer (e.g., for receiving and/or transmitting data from one or more components of the device 100). In particular examples, the external DoD 122 uploads computer-executable instructions to one or more components of the device 100 (e.g., the removable strap 112) through the dongle 118. Additionally or alternatively, the external DoD 122 can also provide data to and/or receive data from certain component(s) of the device 100 (e.g., the removable strap 110) through other dongle configurations, such as through the dongle 116 or a split-dongle configuration (described below in relation to FIG. 6).

In some examples, the external DoD 122 receives performance data (e.g., thermal data, power data, data throughput data, etc.). In certain implementations, the external DoD 122 provides power to one or more components of the device 100. For example, the external DoD 122 can power or charge components of the removable strap 112 by providing power through the dongle 118. In other examples, the external DoD 122 provides no power, in which case the power supply 120 can provide power to components of both the removable strap 110 and the removable strap 112. For instance, the power supply 120 can relay power to the removable strap 112 via electrical connections between the power supply 120, the removable strap 110, the HMD 102, and the removable strap 112. Alternatively, the power supply 120 can relay power to the removable strap 112 via alternative dongle configurations (as described below in relation to FIG. 6).

Additionally or alternatively, the external DoD 122 includes a display that outputs visual information. For example, the external DoD 122 includes a monitor that outputs the same visual content that is shown at the display 106. Thus, advantageously, the external DoD 122 can provide visual feedback (e.g., to developers or programmers) without needing to wear the device 100. Similarly, the external DoD 122 can provide visual feedback (e.g., on a developer computer screen) while a user is simultaneously wearing the device 100.

In one or more examples of the present disclosure, the dongles 116, 118 can include a variety of bandwidth capacities. In certain examples, the dongle 116 includes a first bandwidth, and the dongle 118 includes a second bandwidth greater than the first bandwidth. For example, the dongle 118 can provide (relative to the dongle 116) increased throughput of at least one of data or power. In this manner, the dongle 118 can facilitate larger and/or faster data uploads and downloads (for developer work or testing on the device 100).

In some examples, the dongles 116, 118 can also include variable bandwidths that can be throttled (e.g., reduced) or increased, as may be desired. For example, the dongles 116, 118 can include adjusted bandwidths based on one or more performance metrics (e.g., throughput speeds, visual content quality/resolution, thermal output, etc.). Indeed, as will be discussed more below in relation to FIGS. 4-5, an electronics pod on one or both of the removable straps 110, 112 can generate a thermal output that is spread out or dissipated into the ambient environment (e.g., to reduce heat transfer to a user). To help lessen the thermal output of the electronics pod (and/or an amount of thermal output to dissipate), one or more components of the device 100 can vary (e.g., decrease) the bandwidth through the dongles 116, 118. As used herein, the term "bandwidth" refers to a rate of power transfer (i.e., power bandwidth) or a rate of data transfer (i.e., data bandwidth) through electrical wiring and connections, or else wirelessly. In some cases, the term bandwidth can include a maximum rate of transfer across a given path.

In these or other examples, at least one of data bandwidth or power bandwidth through the dongles 116, 118 can be reduced when the thermal output achieves a threshold thermal output (e.g., a predetermined temperature reading). For instance, a micro controller (discussed below) can throttle bandwidth through at least one of the dongles 116, 118 in response to a temperature sensor in the removable straps 110, 112 indicating a temperature in excess of a certain temperature, such as one hundred degrees Fahrenheit.

Any of the features, components, parts, including the arrangements and configurations thereof shown in FIG. 1 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 1.

Figure 2:
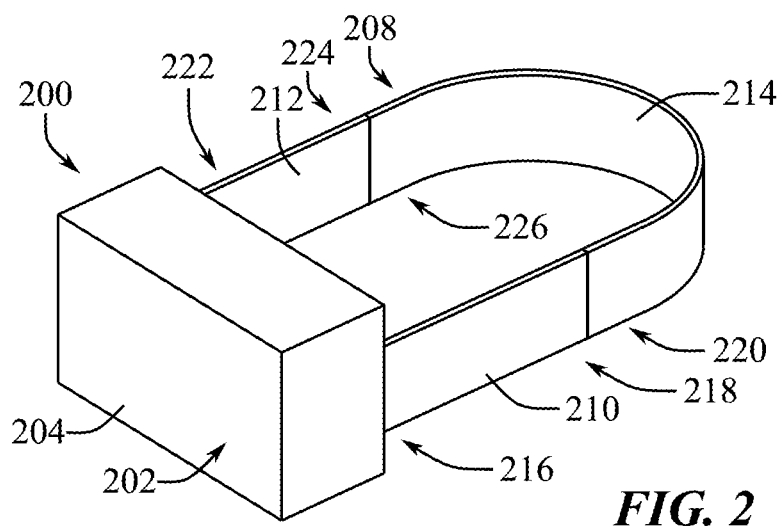
FIG. 2 shows a perspective view of an example of an electronic device.

FIG. 2 shows a perspective view of an example of a wearable electronic device 200 that includes a display portion 202 in the form of an HMD with a housing 204. The display portion 202 can be secured to the head of a user via a modular securement assembly 208 that can include a first removable strap 210, a second removable strap 212, and a retention band 214. The first removable strap 210 can be removably connected to the display portion 202, or the housing 204 thereof, at a first end 216 of the first removable strap 210. A second end 218 of the first removable strap 210 can be removably connected to a first end 220 of the retention band 214. Likewise, the second removable strap 212 can be removably connected to the display portion 202, or the housing 204 thereof, at a first end 222 of the second removable strap 212. A second end 224 of the second removable strap 212 can be removably connected to a second end 226 of the retention band 214.

Figure 3:
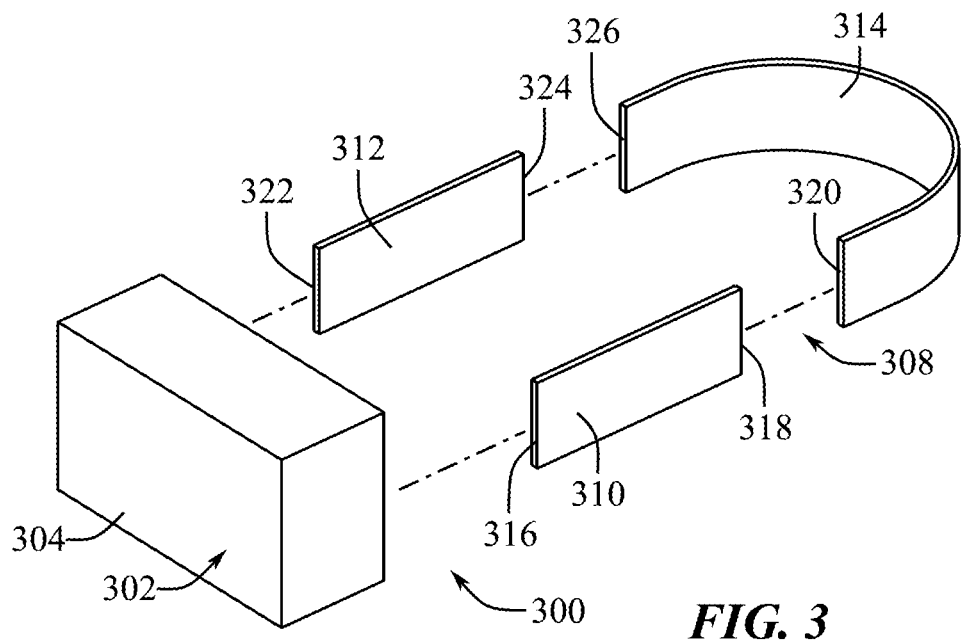
FIG. 3 shows an exploded perspective view of an example of an electronic device.

FIG. 3 shows an exploded perspective view of an example of a wearable electronic device 300, similar to the device 200 shown in FIG. 2. The device 300 of FIG. 3 includes a display portion 302 in the form of an HMD with a housing 304. The display portion 302 can be secured to the head of a user via a modular securement assembly 308 that can include a first removable strap 310, a second removable strap 312, and a retention band 314. The first removable strap 310 can be removably connected to the display portion 302, or the housing 304 thereof, at a first end 316 of the first removable strap 310. A second end 318 of the first removable strap 310 can be removably connected to a first end 320 of the retention band 314. Likewise, the second removable strap 312 can be removably connected to the display portion 302, or the housing 304 thereof, at a first end 322 of the second removable strap 312. A second end 324 of the second removable strap 312 can be removably connected to a second end 326 of the retention band 314.

The example of the device 300 in FIG. 3 is shown in an exploded view to illustrate the modularity of the securement assembly 308, where each of the first and second removable straps 310, 312 can be individually removed or replaced and removably connected with the retention band 314 and display portion 302 or other display component or other output component such as a speaker component or module.

Any of the features, components, parts, including the arrangements and configurations thereof shown in FIGS. 2 and 3 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 2 and 3. For example, at least one of the dongles 116, 118 shown in FIG. 1 above can be correspondingly implemented with the removable straps 210, 212 and/or the removable straps 310, 312 of FIGS. 2-3.

Figure 4:
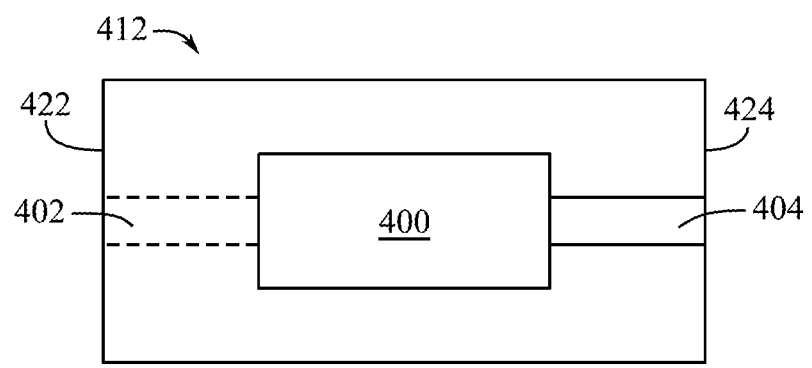
FIG. 4 shows a side profile view of an example removable strap of an HMD system.

FIG. 4 illustrates a side profile view of an example removable strap of an HMD system in accordance with one or more examples of the present disclosure. In particular, FIG. 4 illustrates a removable strap 412 that includes an electronics pod 400, a thermal spreader 402, and a thermal spreader 404. Although a single removable strap is shown, it will be appreciated that both removable straps of an HMD system of the present disclosure can include the same or similar structure shown and described in relation to FIG. 4.

As used herein, the term "electronics pod" refers to a subassembly, an enclosure, or a shell dedicated for housing certain electronics. In certain implementations, electrical components of the electronics pod 400 are communicatively coupled to the HMD 102 (e.g., via wire(s) 534 shown in FIG. 5). Additionally or alternatively, the electronics pod 400 can be coupled to one or more dongles (e.g., the dongles 116, 118 discussed above).

Furthermore, the electronics pod 400 can generate thermal energy or heat as a result of operation. In some examples, it is desirable to dissipate this thermal energy or heat away from a user (e.g., towards an ambient environment and away from a user's head). In some examples, it is also desirable to spread this thermal energy or heat away from the electronics pod 400 (e.g., by utilizing the thermal spreaders 402, 404). In particular examples, the thermal spreader 404 dissipates thermal energy from inside the electronics pod 400. Optionally, the thermal spreader 402 also dissipates thermal energy from inside electronics pod 400.

As will be shown below, a thermal spreaders 402, 404 are in thermal communication with the electronics pod 400. For example, the thermal spreaders 402, 404 contact conductive portions of the electronics pod 400. In particular examples, the thermal spreaders 402, 404 are positioned beyond the electronics pod 400. In these or other examples, the term "beyond" refers to an exterior or outside positioning relative to a boundary/perimeter. For instance, the thermal spreaders 404, 404 are at least partially positioned beyond the electronics pod 400 (e.g., outside of the exterior shell of the electronics pod 400).

As used herein, the term "thermal spreader" refers to a material that transfers or distributes heat from a hotter source to a colder source. In some examples, a thermal spreader is a thermally conductive element that disperses or spreads out thermal energy from the electronics pod 400. To illustrate, a thermal spreader can include conductive wires, foil, strips, sheets, layers, contacts, etc. Thermal spreaders can also include a variety of materials. For example, thermal spreaders can include copper, graphite, diamond, Silver, Gold, silken carbide, aluminum, tungsten, zinc, carbon fiber (e.g., pitched carbon fiber), etc. In the example of pitched carbon fiber, it will be appreciated that the fibers can be oriented in one or more predetermined directions for directional heat transfer.

Any of the features, components, parts, including the arrangements and configurations thereof shown in FIG. 4 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 4.

Figure 5:
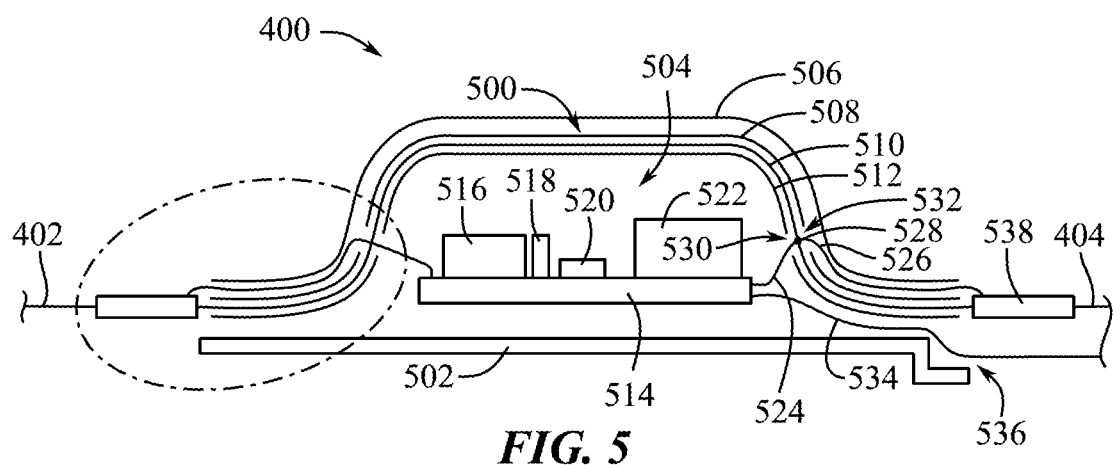
FIG. 5 shows a top cross-sectional profile view of an example electronics pod.

FIG. 5 illustrates a top cross-sectional profile view of an example electronics pod in accordance with one or more examples of the present disclosure. As shown, the electronics pod 400 includes a thermal shell 500 and a cover 502. Together, the thermal shell 500 and the cover 502 define an internal volume 504. Multiple electrical components can be housed within the internal volume 504. These electrical components can also generate thermal energy during operation.

In addition, the thermal shell 500 and the cover 502 can form an at least partially enclosed bowl or U-shaped cross-section. In particular, the example thermal shell 500 includes a plateaued surface. In some examples the plateaued surface can be oriented towards a user's head. In this manner, audio can be transmitted from the electronics pod 400 in a directional fashion towards a user's ear. In alternative examples, the plateaued surface of the electronics pod 400 can contact a user skin (e.g., for vibrational sound via bone conduction).

In certain examples, the cover 502 includes one or more of a variety of materials. In some examples, the cover 502 includes at least one of a foam portion or an aluminum portion. In particular examples, the cover 502 includes a stainless steel portion. Further in some examples, the cover 502 forms a complete enclosure over the internal volume 504. In other examples, the cover 502 forms a partial enclosure over the internal volume 504.

In these or other examples, a bottom surface of the cover 502 can attach to a removable strap. Additionally or alternatively, the cover 502 can be integrated into a removable strap itself. Further, in some examples, the thermal shell 500 includes a variety of layers of material. In some examples, the thermal shell 500 includes a clad (e.g., an overmolded clad). The clad can include a first metal layer 508, a thermal interface material 510, and a second metal layer 512.

The metal layers 508, 512 can include one or more of a variety of metal materials. In some examples, the metal layers 508, 512 include stainless steel. In other examples, the metal layers 508, 512 include chrome, titanium, etc. It will be appreciated, however, that the metal layers 508, 512 need not be metal. For instance, the layers 508, 512 can be a variety of insulative materials, such as foam, plastic, rubber, ceramic, etc. It will also be appreciated that the layers 508, 512 can be different materials, as may be desired.

In some examples, the thermal interface material 510 can include a variety of thermally conductive materials. As used herein, the term "thermal interface material" refers to a material inserted between components or surfaces to enhance a thermal coupling therebetween and/or provide a thermal pathway. Examples of a thermal interface material include a thermal epoxy, thermal paste, thermal adhesive, thermal gap filler, thermally conductive pad, thermal tape, phase-change materials, or thermally conductive coatings (e.g., metallic coatings, diamond coatings, etc.). A thermal interface material can thus have high thermal conductivity. In specific examples, the thermal interface material 510 includes one or more copper layers. In one or more examples, the thermal interface material 510 can move, mold, or conform to the shape of the electronics pod 400. Moreover, as will be discussed below, the thermal interface material 510 can transfer or dissipate thermal energy out of the internal volume 504.

An overmold 506 can be positioned over the thermal shell 500. The overmold 506 can include a variety of materials. To illustrate, the overmold 506 can include softer materials, textured materials, fabric materials, etc. In particular examples, the overmold 506 includes an elastomer material. For instance, the overmold 506 includes a fluorocarbon rubber (e.g., Viton® rubber). In these or other examples, the overmold 506 can conform to a shape of the thermal shell 500. Additionally or alternatively, the overmold 506 can provide rigidity or support to the thermal shell 500.

As mentioned, the electronics pod 400 can house a variety of electrical components. Shown in FIG. 5, the electrical components can include a printed circuit board (PCB) 514, a battery 516, a processor such as a microcontroller 518, a system-on-chip (SoC) 520, and a speaker 522.

The terms "PCB" or "printed circuit board" refer to a logic assembly that includes electronic components. The PCB 514 includes electrical connections and circuitry for mounting various components, including the SoC 520. The PCB 514 can also relay power to mounted electrical components from a power supply (e.g., a battery, not shown in FIG. 3). In certain examples, the PCB 514 is a main logic board. The PCB 514 can be a rigid board (e.g., composed of glass-epoxy compounds). In some examples, the PCB 514 is a multi-layer PCB (e.g., a laminated sandwich structure of conductive and insulating layers). In some examples, the PCB 514 is flexible (e.g., with flexible circuitry made with polyimide). In certain examples, the PCB 514 includes stiffeners added via lamination or pressure sensitive adhesive.

The battery 516 can include a myriad of different types of batteries or power sources. Indeed, the battery 516 can include one or more electrochemical cells with external connections for powering electrical devices or electrical components. For example, in some implementations, the battery 516 includes a lithium ion battery, alkaline battery, etc. In a specific example, the battery 516 includes a rechargeable battery. In other words, the battery 516 can be dispensable or rechargeable, as may be desired.

The microcontroller 518 can direct operation of one or more other components (e.g., within the electronics pod 400 the display 106, etc.). As used herein, the term "microcontroller" refers to a device capable of generating an electrical (or digital) signal responsive to sensor data from a sensor. In one or more embodiments, a microcontroller includes any of a variety of processors (e.g., a system-on-chip, integrated circuit, driver, application processor, crossover processor, etc.). In some embodiments, a microcontroller further includes one or more memory devices (e.g., individual nonvolatile memory, processor-embedded nonvolatile memory, random access memory, memory integrated circuits, DRAM chips, stacked memory modules, storage devices, memory partitions, etc.). In particular embodiments, a microcontroller further includes one or more of input/output ports, counters, timers, etc. It will be appreciated that such a microcontroller can be mounted on a printed circuit board (e.g., a rigid circuit board or a flexible printed circuit).

The SoC 520 can include an integrated circuit that integrates a combination of electrical components for operation of the HMD system. The terms "SoC," and "system-on-chip" refer to an electronic chip that generates thermal energy during operation. One or more of the SoC 520, the microcontroller 518, or the battery 516 can be a "heat source," which term generally refers to component(s) that can generate thermal energy. In some examples, the SoC 520 can include a microchip to generate (e.g., drive) visualizations presented at the display 106 (shown in FIG. 1). It will be appreciated that the thermal energy or heat generated by the SoC 520 can become greater over a duration of use. Similarly, the thermal energy or heat generated by the SoC 520 can become greater when executing more data-intensive operations (e.g., for more complex or high fidelity visualizations).

The speaker 522 can include one or more audio-generating components. Example components of the speaker 522 include a transducer, magnet, coil, diaphragm/driver, etc.

Myriad other components in the electronics pod 400 can be included (albeit not expressly shown in FIG. 5). For example, the electronics pod 400 can include a heat sink, microphone, antenna, one or more sensors (e.g., temperature sensors, pressure sensor, accelerometer, magnetometer, etc.), or other suitable electronic elements.

In one or more examples, components of the electronics pod 400 can be electrically coupled to a power supply positioned outside of the electronics pod 400. For example, wire(s) 534 can extend through a wire opening 536 defined by the cover 502. The wire(s) 534 can connect to the PCB 514 on one end, and the wire(s) 534 can connect to a power supply (not shown) on the other end. In this manner, the wire(s) 534 can provide power to each component electrically coupled to the PCB 514.

Components of the electronics pod 400 can also be thermally coupled to at least one of the ambient environment outside the electronics pod 400 or various thermal elements. To illustrate, the electronics pod 400 comprises a thermal conduit. As used herein, the term "thermal conduit" refers to a thermal path for heat flow. A thermal conduit may be conceptualized as linear or direct (e.g., along wire paths). However, a thermal conduit is not limited to such a flow path. Indeed, thermal paths can be linear or curved (e.g., non-linear), as a function of thermal properties for a given medium (whether solid, liquid, or gaseous). Further, thermal conduits are not limited to two-dimensional space. It will be appreciated that thermal conduits of the present disclosure include three-dimensional thermal paths through a given volume. In at least some examples, however, a thermal conduit of the present disclosure includes at least one of a thermal connector 524 or a thermal connector 526, both of which can be composed of one or more wires (e.g., copper wires) for conductive heat transfer.

In some examples, the thermal conduit includes a thermal connector 524. The thermal connector 524 is positioned inside the internal volume 504 and connects the PCB 514 and each associated component to the thermal interface material 510 at a connection point 528. Alternatively, the thermal connector 524 connects a specific component of the electronics pod 400 (e.g., the SoC 520) to the thermal interface material 510.

Thermal energy can be conductively transferred from components of the electronics pod 400 through the thermal connector 524. In turn, the thermal energy can be spread or dissipated along the thermal interface material 510. In at least some examples, a thermal conduit includes a thermal connector 526. The thermal connector 526 is attached to the thermal interface material 510 at the connection point 528. The thermal connector 526 then extends between clad layers of the thermal shell 500 (or over the thermal shell 500 underneath the overmold 506 as shown). The thermal connector 526 further extends to a connection 538 beyond the electronics pod 400, where the thermal connector 526 and the thermal interface material 510 thermally couple to the thermal spreader 404. By coupling the thermal connector 526 and the thermal interface material 510 to the thermal spreader 404, thermal energy from the electronics pod 400 can be even further dissipated or spread along the removable strap. In specific examples, the thermal spreader 404 directs this thermal energy towards a second end 424 that opposes a first end 422 of the removable strap 412. In doing so, the thermal energy is directed away from a user's temple.

However, as indicated via dashed lines, the removable strap 412 can include the thermal spreader 402 and associated heat-dissipation elements. The thermal spreader 402, like the thermal spreader 404, can connect to the thermal interface material 510 and a thermal connector, in a similar manner as just discussed above. In this way, thermal energy from the electronics pod 400 can be directed along the thermal spreader 402 towards the first end 422 of the removable strap 412, as may be desired (e.g., to decrease a thermal load through the thermal connector 524, the thermal connector 526, and/or the thermal spreader 404).

To accommodate these and/or other thermal couplings of the present disclosure, the thermal shell 500 includes certain etched portions that expose segments of the thermal interface material 510. Indeed, the thermal shell 500 includes an etched opening 530 and an etched opening 532. The etched openings 530, 532 can be formed in a variety of ways. In some examples, chemical etching may be used to form the etched openings 530, 532. In other examples, laser etching may be used to form the etched openings 530, 532. In such examples, the etched opening 530 is defined by a removed portion of the metal layer 512. Similarly, the etched opening 532 is defined by a removed portion of the metal layer 508. Through the etched openings 530, 532, the thermal interface material 510 is exposed for one or more conductive connections (e.g., for conductive heat transfer).

Additionally or alternatively to the thermal connector 524, heat can be transferred from electrical components of the electronics pod 400 to the thermal interface material 510 via forced convection or non-force convection. For example, thermal energy can convectively move through the etched opening 530 and impinge upon the thermal interface material 510. As used herein, the terms "conduction" or "natural conduction" refer to the heat transfer via conductively connected components. By contrast, the term "non-force convection" refers to free or natural convection, where air motion is caused by natural, buoyancy forces that result from the density variations due to variations of thermal temperature in the air. Non-forced convection differs from forced convection, where a fluid (e.g., air) is forced to flow by an internal source such as fans, by stirring, or pumps to create an artificially induced convection current.

Any of the features, components, parts, including the arrangements and configurations thereof shown in FIG. 5 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 5.

Figure 6:
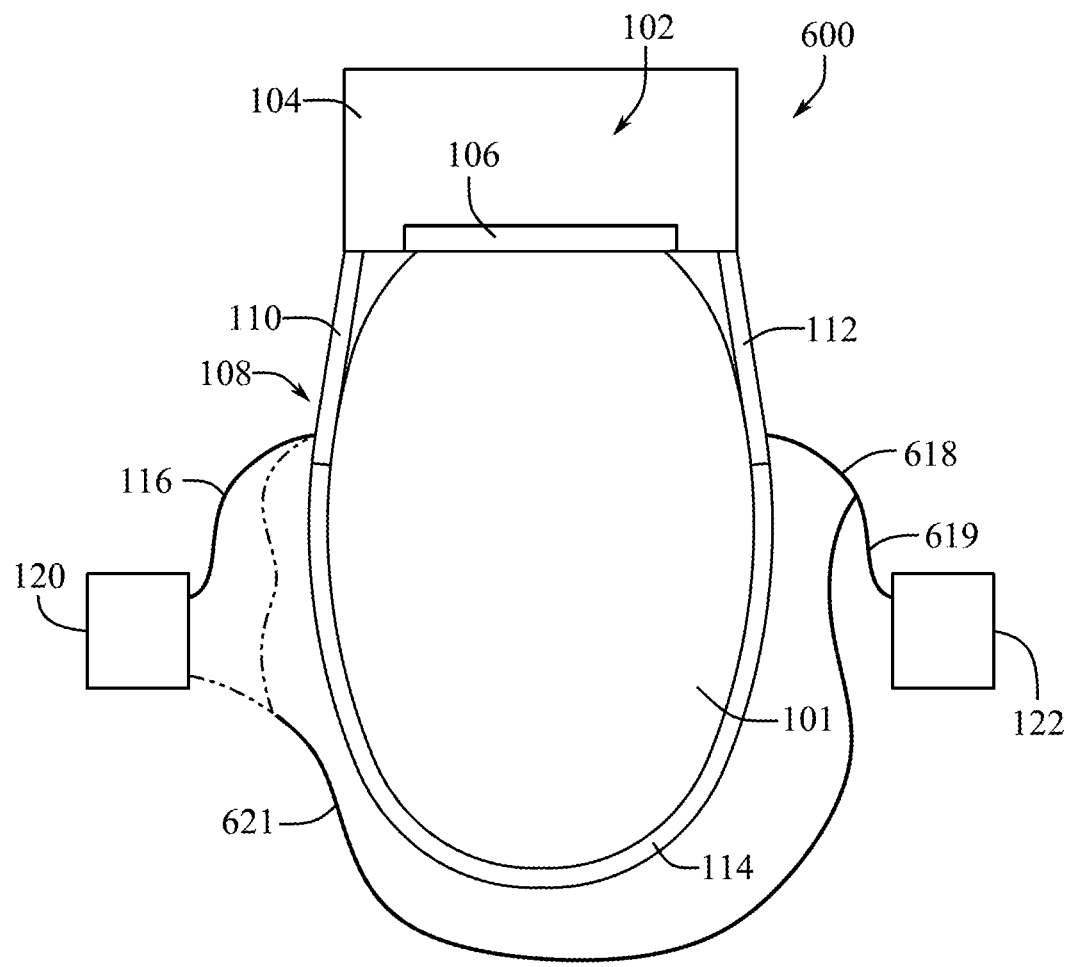
FIG. 6 shows a top view of another example of an electronic device donned by a user.

FIG. 6 shows a top view of a wearable electronic device 600 being worn on the head 101 of a user. The wearable electronic device 600 is the same as or similar to the wearable electronic device 100 discussed above in relation to FIG. 1. Differently however, the wearable electronic device 600 includes a dongle 618. As shown, the dongle 618 is a split dongle. In particular, the dongle 618 includes a first portion 619 connecting the removable strap 112 and the external DoD 122. In addition, the dongle 618 includes a second portion 621 connecting the removable strap 112 to at least one of the power supply 120 or the removable strap 110.

Advantageously, the dongle 618 can provide a variety of use-case applications. For instance, the power supply 120 can additionally provide power to the removable strap 112 via the second portion 621. In another example, the external DoD 122 can provide data to both of the removable straps 110, 112 via the dongle 618. In at least some examples, the dongle 618 can improve bandwidth through the wearable electronic device 600 (e.g., by circumventing the HMD 102 for transmission of data around the wearable electronic device 600). By transmitting data to the removable strap 110 through the dongle 618, and in particular through the second portion 621, the wearable electronic device 600 can also include reduced thermal loads in the bypassed components (e.g., through the removable strap 112 and the HMD 102).

Any of the features, components, parts, including the arrangements and configurations thereof shown in FIG. 6 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 6.

Figure 7:
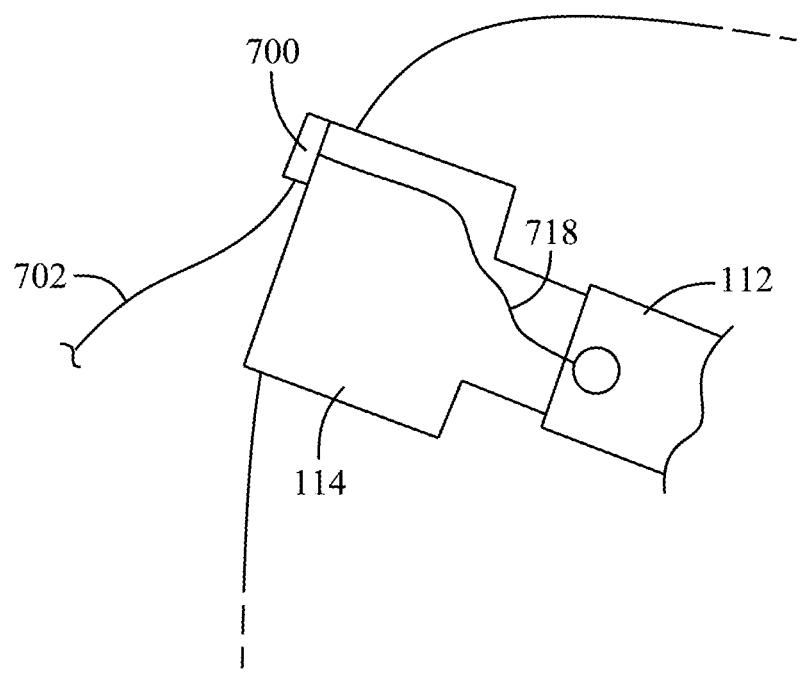
FIGS. 7-8 show example cable management mechanisms of an example HMD system.
Figure 8:
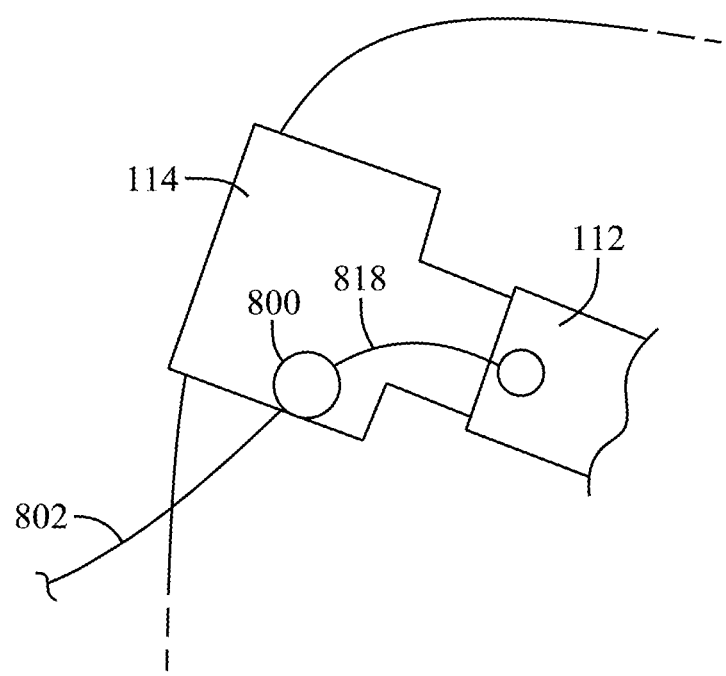

FIGS. 7-8 illustrate schematic views of example cable management mechanisms for HMD systems in accordance with one or more examples of the present disclosure. In particular, FIG. 7 shows a dongle 718 connected to the removable strap 112. The dongle 718 can be the same as or similar to the dongles 118, 618 discussed above. The dongle 718 also includes slack 702 (e.g., a cable portion for routing to the external DoD 122). To help prevent unwanted positioning or tangling, the retention band 114 can include a cable management mechanism 700.

The cable management mechanism 700 can route, position, tension, or otherwise manage the slack 702 for the dongle 718. In some examples, the cable management mechanism 700 includes an external ring, clip, button snap, Velcro® strip, tie, etc. attached to the retention band 114. In other examples, the cable management mechanism 700 includes an aperture, slot, or recess within the retention band 114.

Similarly, FIG. 8 shows a dongle 818 connected to the removable strap 112. The dongle 818 can be the same as or similar to the dongles 118, 618 discussed above. Like the dongle 718, the dongle 818 includes slack 802 (e.g., for routing to the external DoD 122). A cable management mechanism 800 is configured to efficiently handle the slack 802, including one or more of a length or tension of the slack 802.

In some examples, the cable management mechanism 800 includes a retractable spool. Via the retractable spool, the slack 802 can be pulled out or lengthened with manual interaction. In some examples, the slack 802 can be pulled out to a desired length and locked in place such that the retractable spool maintains an amount or tension of the slack 802. In certain examples, the cable management mechanism 800 can automatically wind the slack 802. In other examples, the cable management mechanism 800 winds the slack 802 in response to user interaction with at least one of the slack 802 or the cable management mechanism 800. For instance, the cable management mechanism 800 includes a button release to initiate winding of the slack 802. In other instances, the cable management mechanism 800 can wind the slack 802 in response to a pull (e.g., a directional tug) of the slack 802.

Any of the features, components, parts, including the arrangements and configurations thereof shown in FIGS. 7-8 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 7-8.

As mentioned above, the electronics pod (e.g., the electronics pod 400 discussed above) can be utilized for data transfer and audio generation. In some examples, however, data transfer can occur at locations outside of the electronics pod. The following figures relate to such examples.

In these or other examples, locating elements for data transfer (e.g., active Universal Serial Bus "USB" components) outside of the electronics pod can provide certain advantages. For instance, in some examples, a thermal environment of the electronics pod can be improved and/or more easily controlled by housing speaker components in the electronics pod and relocating or otherwise modifying the operation of the data transfer components so that the entire thermal load of the speaker components and the data transfer components are not both borne by the electronics pod. To illustrate, and as mentioned above, the device 100 can monitor the thermal environment of the electronics pod (e.g., the electronics pod 400) via one or more temperature sensors and correspondingly throttle the power consumption of at least one of audio components or data transfer components. In this way, the device 100 can maintain predetermined thermal levels of the electronics pod. However, by removing data transfer components from the electronics pod, the device 100 can significantly reduce the power consumption (and therefore the thermal energy generation) within the electronics pod. In certain implementations, removing data transfer components from the electronics pod can reduce power consumption within the electronics pod, and in some examples, the reduction in power can range from about 30 percent to about 85 percent.

According to other examples, separating data transfer from speaker components in the electronics pod can, in some instances, reduce electric noise (e.g., electromagnetic frequency radiation) generated within the electronics pod, thereby improving audio clarity and/or component integrity. Additionally, separating data transfer from the speaker components in the electronics pod can in some examples, result in a reduction in data transfer latency. As will be described below, the data transfer components can be moved closer to another device (e.g., the external DoD 122)—where "closer" in location refers to a relative distance or path of travel for data bytes along a wired connection. That is, the data transfer components can be moved out of the electronics pod for a relatively closer positioning along the wired connection to the external DoD 122.

Low-latency connections via wired connections (as opposed to wireless connections) can allow a variety of use cases with various external DoDs 122. For instance, a low-latency connection of the present disclosure can allow robust, fast data connections to other devices, such as audio/peripheral devices (e.g., for spatial audio or surround sound capabilities without lag to visual outputs). In another example, a low-latency connection can allow the device 100 to connect to multiple, large high-resolution displays (e.g., 8K resolution displays for use, in-store demonstrations, or developer testing) without connectivity issues. In yet another example, a low-latency connection can allow the device 100 to connect to other head-mountable devices in real-time (e.g., for multiplayer or shared-audience experiences, and the like).

Figure 9:
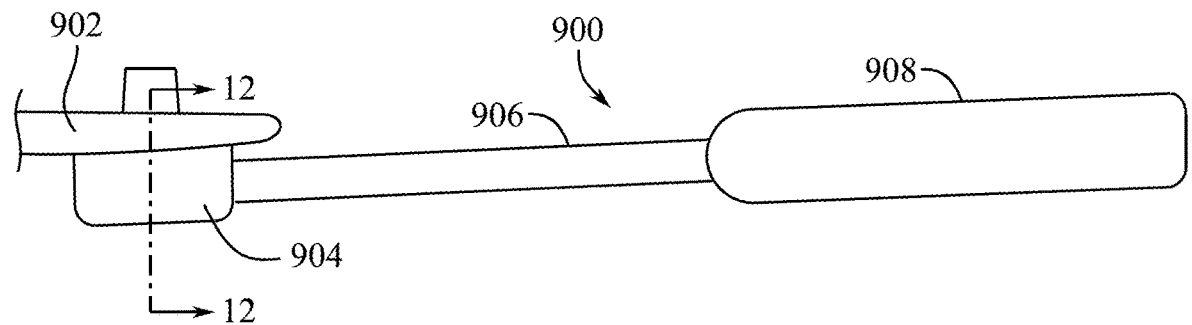
FIG. 9 illustrates a side view of a dongle in accordance with one or more examples of the present disclosure.

In particular examples, and as will now be discussed in relation to FIGS. 9-10, data transfer components can be moved to the dongle. FIG. 9 illustrates a side view of a dongle 900 in accordance with one or more examples of the present disclosure. As shown, the dongle 900 can include a connection 904 that connects the dongle 900 to a removable strap 902, which can be the same as, or similar to, the removable strap 112 discussed above in relation to the foregoing figures. Via the connection 904, the dongle 900 can transfer power and/or data between the removable strap 902 and another device (e.g., the external DoD 122). In some examples, the connection 904 is removably attached to the removable strap 112. In other examples, the connection 904 is permanently attached to the removable strap 112. As will be discussed below in relation to FIGS. 11-12, the connection 904 can include a flex circuit that is formed (e.g., bent, folded, rolled, collapsed, etc.) to fit inside a dome, shell, housing, or enclosure at the connection 904.

The dongle 900 can further include a cable 906 extending between the connection 904 and a boot 906. The cable 906 can include a variety of different wires, strands, or groupings of wire, etc. that can transfer data and/or power between the boot 908 and the connection 904. In some examples, one or more wires of the cable 906 are shielded. Further, in some examples, the cable 906 is rotatable relative to the connection 904 (e.g., to provide different angular orientations as may be desired for increased user comfort or different use-case scenarios). In other examples, the cable 906 is fixed relative to the connection 904.

The boot 908 can include a portion of the dongle 900 that connects the dongle 900 to another device (e.g., the external DoD 122). In some examples, the boot 908 can include a variety of different ports, connectors, adapters, plugs, prongs, mating features, etc. Additionally, the boot 908 can include one or more computing elements, such as a processor (e.g., a system-on-chip, integrated circuit, driver, application processor, crossover processor, etc.). In some examples, the boot 908 further includes one or more memory devices (e.g., individual nonvolatile memory, processor-embedded nonvolatile memory, random access memory, memory integrated circuits, DRAM chips, stacked memory modules, storage devices, memory partitions, etc.). In a particular exemplary implementation, the boot 908 includes a particular type of connection, such as a USB-C connection.

By including one or more computing elements in the boot 908, the boot 908 can offload processes performed elsewhere by the device 100. For example, the boot 908 can serve as the data transfer hub where data transfer between the device 100 and another device (e.g., the external DoD 122) can occur. By offloading one or more processes (e.g., data transfer) from other areas of the device 100, the boot 908 can provide improved thermal levels in the electronics pod 400, reduced e-noise with the speaker components in the electronics pod 400, and/or decreased data transfer latency. Additional details regarding the boot 908 are discussed below in relation to FIG. 10.

Figure 10:
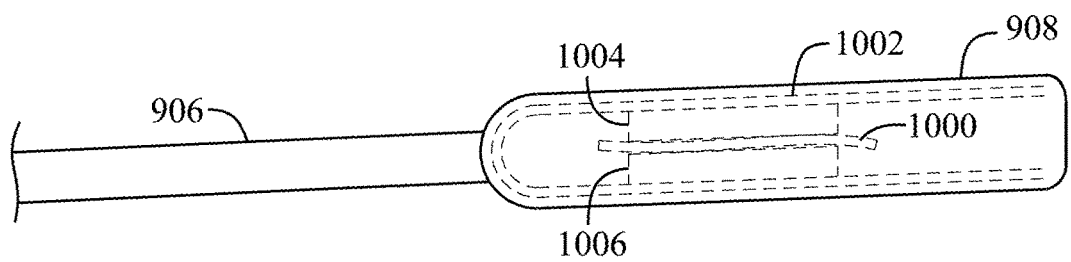
FIG. 10 illustrate a close-up view of a dongle boot in accordance with one or more examples of the present disclosure.

FIG. 10 illustrate a close-up view of the boot 908 in accordance with one or more examples of the present disclosure. As shown, the boot 908 can include a main logic board ("MLB") 1000. The MLB 1000 can include a printed circuit board, including a single-layer substrate, a multi-layer substrate, a rigid substrate, a flexible substrate, a rigid-flex substrate, a high frequency circuit board, an aluminum-backed circuit board, and the like.

The boot 908 can additionally include a thermal spreader 1002. The thermal spreader 1002 can wrap at least partially around the boot 908. In some examples, the spreader 1002 is positioned adjacent to an exterior surface of the boot 908 (e.g., for increased heat transfer to the external environment). In these or other examples, the thermal spreader 1002 can be the same as, or similar to, the thermal spreaders 402, 404 discussed above. Accordingly, the thermal spreader 1002 can include conductive wires, foil, strips, sheets, layers, contacts, etc. The thermal spreader 1002 can also include a variety of materials. For example, the thermal spreader 1002 can include copper, graphite, diamond, silver, gold, silken carbide, aluminum, tungsten, zinc, carbon fiber (e.g., pitched carbon fiber), etc. In the example of pitched carbon fiber, it will be appreciated that the fibers can be oriented in one or more predetermined directions for directional heat transfer. In certain examples, the thermal spreader 1002 is also a metal shield cage (e.g., for electrical noise isolation).

The boot 908 can further include thermal connectors 1004, 1006. The thermal connectors 1004, 1006 can reduce thermal levels inside the boot 908 (particularly at the MLB 1000) by thermally connecting the MLB 1000 to the thermal spreader 1002. In this way, heat can transfer out of the boot 908 (i.e., away from the MLB 1000) and into the external environment around the boot 908. In these or other examples, the thermal connectors 1004, 1006 can include a conductive joint (e.g., a weld, soldered joint, etc.), thermally conductive material, thermally conductive filler, and/or thermal tape or adhesive.

Any of the features, components, parts, including the arrangements and configurations thereof shown in FIGS. 9-10 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 9-10.

As mentioned above, the connection 904 between the removable strap 902 and the cable 906 can include various electrical connections. The following discussion includes further detail regarding a flex circuit and associated wire terminations compatible with a small form factor of the connection 904.

Figure 11:
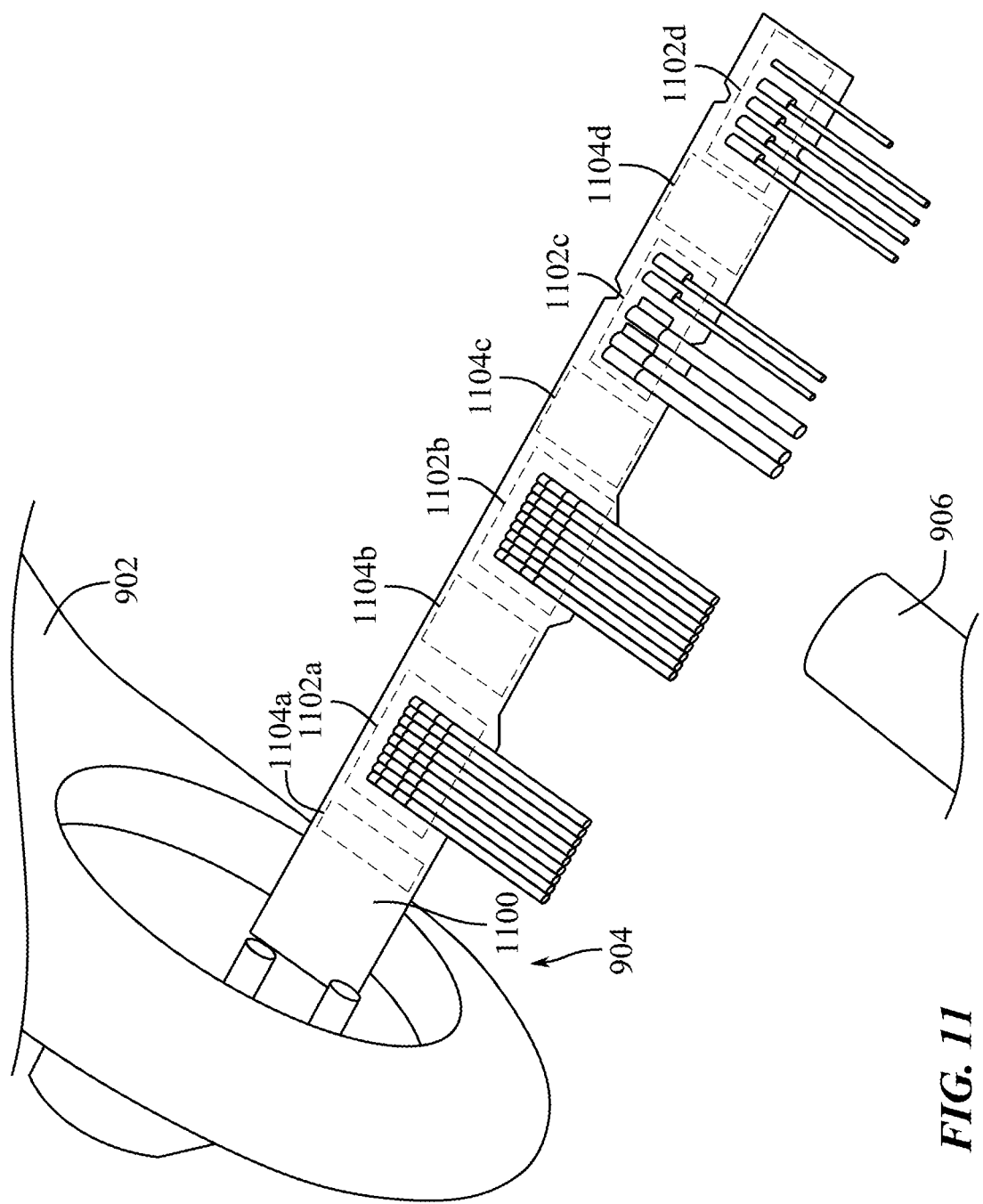
FIGS. 11-12 illustrate an exploded assembly view and a cross-sectional view, respectively, of a dongle connection in accordance with one or more examples of the present disclosure.
Figure 12:
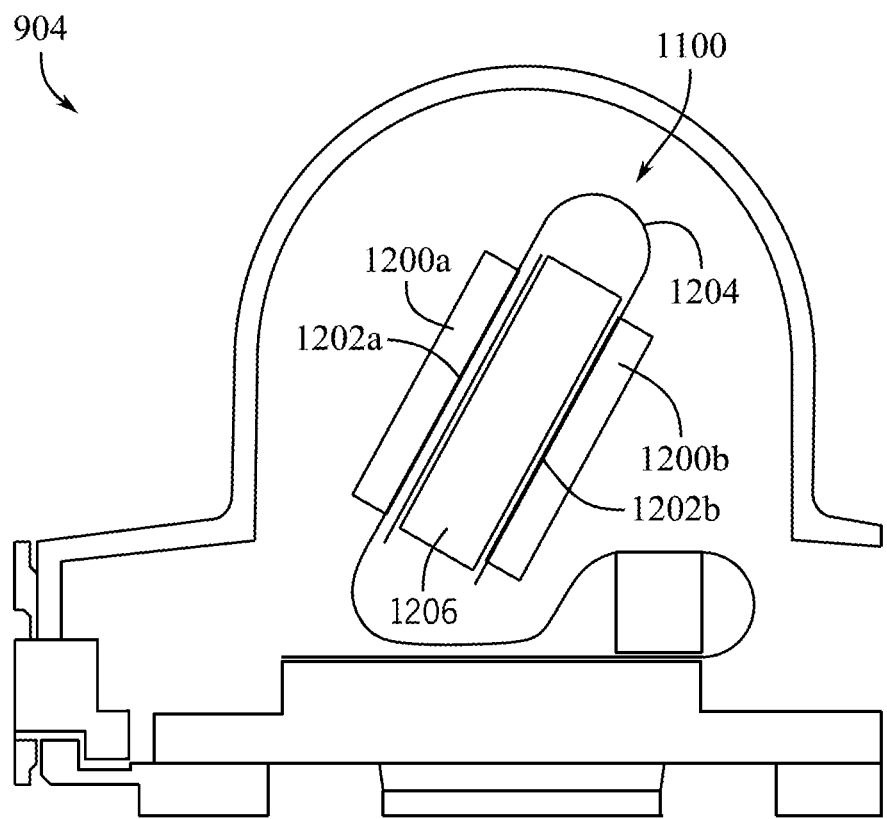

FIGS. 11-12 illustrate an exploded assembly view and a cross-sectional view, respectively, of the connection 904 in accordance with one or more examples of the present disclosure. As shown, the connection 904 can include a flex circuit 1100. The flex circuit 1100 can include a variety of flexible circuit boards that have one or more portions that can be bent, folded, rolled, malleably fitted, or otherwise manipulated to a desired configuration.

In some examples, the flex circuit 1100 can include termination areas 1102. The termination areas 1102 can correspond to hot bar regions (e.g., active, hot, or electrically conductive areas) where wires from the cable 906 can terminate onto the flex circuit 1100. In some examples, the termination areas 1102 can included soldered portions that electrically connect wires to the termination areas 1102. Additionally or alternatively, the termination areas 1102 can include stiffeners (e.g., to ensure the termination areas 1102 are not bent or deformed, causing undesired stress/strain at the wire terminations).

In particular examples, the termination areas 1102 include a set of termination areas 1102a-1102d. In certain examples, the termination areas 1102a-1102d are interspaced by flexible areas 1104 (namely, flexible areas 1104a-1104d). The flexible areas 1104a-1104d can include flexible portions of the flex circuit 1100, including portions that are malleable, bendable, foldable, or otherwise manipulate-able. By including the flexible areas 1104a-1104d between the termination areas 1102a-1102d, the flexible circuit 1100 can be formed into a desired shape that fits within the connection 904. This assembly approach can facilitate a small form factor for the connection 904 despite a relatively large number of wires within the cable 906. Indeed, without the flexible areas 1104a-1104d, the connecting circuit board could potentially take up a comparatively greater amount of real estate, and the amount (i.e., length) of wire to form the connections could significantly increase. In contrast, reduced form-factor configurations (e.g., folded configurations as shown in FIG. 12) of the flex circuit 1100—enabled by the flexible areas 1104a-1104d—allow wires to terminate at the termination areas 1102a-1102d in a densely clustered manner. For instance, the termination areas 1102a-1102d can be folded on top of each other in sequential fashion as the wire-termination process is performed, thereby reducing wire consumption and unnecessary wire slack).

The below description discusses one example configuration of the flex circuit 1100 when positioned within the connection 904. As shown in FIG. 12, the flex circuit 1100 can be positioned within the connection 904 in a reduced form-factor configuration. In particular, the flex circuit 1100 is folded. However, other reduced form-factor implementations of the flex circuit 1100 can include rolled configurations, shaped configurations, and the like.

Further shown in FIG. 12, wire groups 1200a, 1200b are respectively joined to the flex circuit 1100 at termination areas 1202a, 1202b. The termination areas 1202a, 1202b are spaced apart by a flexible area 1204. In particular, the termination areas 1202a, 1202b can be folded onto each other, thus positioning the wire groups 1200a, 1200b in a stacked configuration.

In these or other examples, the flex circuit 1100 can include a spacer 1206. The spacer 1206 can include a material that is resistant to deformation or otherwise prevents compression of the flex circuit 1100 into itself. Thus, the spacer 1206 can include a variety of pads, guards, or bumpers that can protect the flex circuit from damaging itself. In addition, the spacer 1206 can include a mechanical stop that prevents the flex circuit 1100 from over rotating or over bending (which could create undesired sharp bending angles at the flexible area 1204 and lend to a potential failure point).

Any of the features, components, parts, including the arrangements and configurations thereof shown in FIGS. 11-12 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 11-12.

While the exemplary systems and methods can operate without access to personal information data, in some examples, the present systems and methods can leverage personal information data to enhance or customize the experience for a user. When such personal information data is used by the present exemplary systems and methods, such use of personal information data shall be in compliance with well-established privacy policies and/or privacy practices, and shall meet or exceed industry or governmental requirements for maintaining personal information data private and secure. Further personal information data should be managed and handled in a way to minimize risks of unintentional or unauthorized access or use.

The foregoing description includes specific nomenclature to provide a thorough understanding of the described embodiments. However, the specific details are not required in order to practice the described embodiments and are presented for purposes of illustration and description. They are not intended to be exhaustive or to limit the embodiments to the precise forms disclosed. Rather, many modifications and variations are possible in view of the above teachings.

What is claimed is:

1. A head-mountable display (HMD) system, comprising:
a display portion including a display; and
a modular securement assembly connectable to the display portion, the modular securement assembly comprising:
a removable strap comprising an electronics pod with a thermal shell and a thermal conduit, the thermal shell comprising a clad including:
a first metal layer;
a second metal layer; and
a third metal layer disposed between the first metal layer and the second metal layer, wherein the third metal layer comprises a copper layer; and
a retention band connectable to the removable strap.

2. The HMD system of claim 1, further comprising a processor that, in response to a threshold thermal output of the electronics pod, throttles a power bandwidth or a data bandwidth through the removable strap.

3. The HMD system of claim 1, further comprising a dongle connectable to the removable strap and to at least one of a power supply, a computing device, or an external display.

4. The HMD system of claim 3, wherein the dongle comprises a split dongle configured to connect the removable strap to the power supply and at least one of the computing device or the external display.

5. The HMD system of claim 3, wherein the dongle comprises a split dongle configured to connect the removable strap to an additional removable strap.

6. The HMD system of claim 1, wherein the first metal layer comprises a first stainless steel layer and the second metal layer comprises a second stainless steel layer.

7. The HMD system of claim 1, wherein the thermal conduit comprises a first thermal connector configured to thermally couple one or more components of the electronics pod and the copper layer.

8. The HMD system of claim 7, wherein the thermal conduit comprises a second thermal connector configured to thermally couple the copper layer and a thermal spreader positioned beyond the electronics pod.

9. A removable strap for a head-mountable display system, the removable strap comprising:
a display connector;
a dongle connector;
an electronics pod positioned between the display connector and the dongle connector, the electronics pod comprising a clad thermal shell including a first layer, a second layer, and an internal layer disposed between the first layer and the second layer, the internal layer comprising a thermal interface material different than the first layer and the second layer, the electronics pod comprising a heat source; and
a thermal spreader positioned at least between the electronics pod and the dongle connector, the thermal spreader configured to dissipate thermal energy from the electronics pod.

10. The removable strap of claim 9, wherein the thermal shell is overmolded with a fluorocarbon rubber.

11. The removable strap of claim 9, wherein the electronics pod comprises an outer surface defining an etched portion exposing the thermal shell.

12. The removable strap of claim 11, wherein the thermal spreader is in contact with the thermal shell through the etched portion.

13. The removable strap of claim 9, wherein the thermal shell is at least partially exposed inside the electronics pod.

14. The removable strap of claim 9, wherein the thermal interface material comprises at least one of a copper layer or a graphite layer.

15. The removable strap of claim 9, wherein the heat source comprises at least one of a battery or a system-on-chip.

16. A head-mountable display (HMD) system, comprising:
a display portion including a display;
a modular securement assembly connectable to the display portion, the modular securement assembly comprising:
a first removable strap comprising a first thermal shell and a first thermal spreader, the first thermal shell comprising a first layer, a second layer, and an internal layer disposed between the first layer and the second layer, the internal layer comprising a thermal interface material different than the first layer and the second layer;
a second removable strap comprising a second thermal shell and a second thermal spreader; and
a retention band connected to the first removable strap and the second removable strap;
a first dongle comprising a first bandwidth and configured to connect the first removable strap to a power supply; and
a second dongle comprising a second bandwidth greater than the first bandwidth, the second dongle configured to connect the second removable strap to at least one of a computing device or an external display.

17. The HMD system of claim 16, wherein at least data is transmissive through the second dongle.

* * * * *